(12) United States Patent
Smit et al.

(10) Patent No.: US 8,041,973 B2
(45) Date of Patent: *Oct. 18, 2011

(54) INTERRUPT/WAKE-UP OF AN ELECTRONIC DEVICE IN A LOW POWER SLEEP MODE WHEN DETECTING A SENSOR OR FREQUENCY SOURCE ACTIVATED FREQUENCY CHANGE

(75) Inventors: Zacharias Marthinus Smit, Chandler, AZ (US); Keith Curtis, Gilbert, AZ (US); James (Jim) Simons, Fraser, CO (US); Jerrold S. Zdenek, Maricopa, AZ (US); John Charais, Phoenix, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 575 days.

This patent is subject to a terminal disclaimer.

(21) Appl. No.: 12/109,692

(22) Filed: Apr. 25, 2008

(65) Prior Publication Data

US 2008/0272835 A1 Nov. 6, 2008

Related U.S. Application Data

(60) Provisional application No. 60/915,767, filed on May 3, 2007.

(51) Int. Cl.
*G06F 1/32* (2006.01)
*G06F 1/00* (2006.01)

(52) U.S. Cl. .......................... 713/323; 713/320; 713/322
(58) Field of Classification Search .................... 713/320
See application file for complete search history.

(56) References Cited

U.S. PATENT DOCUMENTS

| 5,172,065 | A | * | 12/1992 | Wallrafen | 324/683 |
|---|---|---|---|---|---|
| 5,182,810 | A | | 1/1993 | Bartling et al. | 395/750 |
| 6,152,702 | A | * | 11/2000 | Codina et al. | 417/63 |
| 6,650,189 | B1 | | 11/2003 | Romao | |
| 6,703,599 | B1 | * | 3/2004 | Casebolt et al. | 250/221 |
| 7,375,535 | B1 | * | 5/2008 | Kutz et al. | 324/658 |
| 7,495,652 | B2 | * | 2/2009 | Klinghult | 345/156 |
| 2002/0091955 | A1 | * | 7/2002 | Christopher | 713/323 |
| 2005/0078093 | A1 | * | 4/2005 | Peterson et al. | 345/173 |
| 2005/0228320 | A1 | * | 10/2005 | Klinghult | 601/46 |

FOREIGN PATENT DOCUMENTS

CN 1612484 A 5/2005

(Continued)

OTHER PUBLICATIONS

Page, Andrew; "Add capacitive sensing to a digital handset"; Cypress Semiconductor; Aug. 29, 2005; pp. 1-4.*

(Continued)

*Primary Examiner* — Ryan Stiglic
(74) *Attorney, Agent, or Firm* — King & Spalding L.L.P.

(57) ABSTRACT

Activation of an external sensor coupled to an electronic device will change the frequency of a low power oscillator in the electronic device that runs during a low power sleep mode of the electronic device. When a change in frequency of the low power oscillator is detected, the electronic device will wake-up from the low power sleep mode. In addition, when a change in frequency from an external frequency source is detected, the electronic device will wake-up from the low power sleep mode.

32 Claims, 8 Drawing Sheets

FOREIGN PATENT DOCUMENTS

| | | | |
|---|---|---|---|
| EP | 1357510 | A1 | 10/2003 |
| GB | 2279750 | A | 1/1995 |
| GB | 2409058 | A | 6/2005 |
| WO | WO96/42068 | A1 | 12/1996 |

OTHER PUBLICATIONS

International Search Report & Written Opinion dated Aug. 21, 2008 for PCT/US2008/062490.

International Search Report and Written Opinion for Application No. PCT/US2008/062484 (13 pages), Aug. 21, 2008.

International Search Report and Written Opinion for Application No. PCT/US2008/062496 (13 pages), Aug. 21, 2008.

International Search Report and Written Opinion for Application No. PCT/US2008/062501 (14 pages), Aug. 21, 2008.

Chinese Office Action with English translation; CN Application No. 200880014671.6, 26 pages, Dec. 21, 2010.

* cited by examiner

INTERRUPT/WAKE-UP OF AN ELECTRONIC DEVICE IN A LOW POWER SLEEP MODE WHEN DETECTING A SENSOR OR FREQUENCY SOURCE ACTIVATED FREQUENCY CHANGE

RELATED PATENT APPLICATIONS

This application claims priority to commonly owned U.S. Provisional Patent Application Ser. No. 60/915,767; filed May 3, 2007; entitled "Digital Device Based Sensor to Digital Conversion, e.g., Frequency Measurement, Including Interrupt/Wake-Up On Frequency Change, During Device Sleep," by Zacharias Marthinus Smit, Keith Curtis, Jim Simons, Jerry Zdenek and John Charais; and is hereby incorporated by reference herein for all purposes. This application is also related to commonly owned U.S. patent application Ser. Nos. 12/109,646, 12/109,733 and 12/109,911; all filed Apr. 25, 2008; and all entitled "Interrupt/Wake-Up of an Electronic Device in a Low Power Sleep Mode When Detecting a Sensor or Frequency Source Activated Frequency Change," by Zacharias Marthinus Smit, Keith Curtis, Jim Simons, Jerry Zdenek and John Charais.

TECHNICAL FIELD

The present disclosure relates to integrated circuit electronic devices, e.g., microcontrollers and the like, that have circuits that can detect a change in frequency caused by an event, such as activation of a sensor, and to also wake-up/interrupt the electronic device when it is in a low power sleep mode.

BACKGROUND

Currently, all electronic devices implementing any form of capacitive sensing (for example touch sensors) require that the electronic device be awake and operating. This requires full power being applied to the electronic device at all times while waiting for a sensing event to occur.

SUMMARY

Therefore there is a need for sensing that can be done when an electronic device is in a low power sleep mode, and preferably by using existing infrastructure of digital systems having event sensors, e.g., electronic devices in combination with capacitive touch sensors or comparators. In addition, wake-up (or interrupt) from deep sleep on frequency change functionality is also desirable in an electronic device.

According to teachings of this disclosure, a system, method and apparatus having the ability to measure frequency change while in a sleep mode and/or an operating mode and/or the functionality to automatically wake-up/interrupt/detect when the measured signal changes frequency is disclosed herein. A frequency change may be due to a number of reasons, including, but not limited to, a change in the value(s) of resistance (R), inductance (L) and/or capacitance (C). For example, a wake-up/interrupt may be generated when a capacitive sensor is touched, an external frequency source changes frequency, etc. Also, it is contemplated and within the scope of this disclosure, that wake-up/interrupt/detection by the electronic device may occur upon completion of a parameter measurement for the purpose of detecting a change in the parameter, e.g., frequency, voltage, count, etc., by a software program running in the electronic device.

An electronic device having an existing watchdog timer oscillator(s) (or alternatively other existing low power oscillators that are normally running when a device is in a low power sleep mode) and/or watchdog counter may be used as a time base, e.g., time interval(s), for frequency measurement during device sleep. The watchdog timer and/or watchdog counter may be operational when the majority of circuits of the electronic device are in a deep sleep low power mode, and thus may be used to wake-up the electronic device from the low power deep sleep mode. The existing watchdog circuits of an electronic device may be used in this fashion.

According to a specific example embodiment of this disclosure, an electronic device having a low power sleep mode may comprise: circuits capable of being placed into a sleep mode; input-output (I/O) capable of being placed into the sleep mode, the I/O coupled to the circuits; sleep/wake-up logic for controlling when the circuits and the I/O are in the sleep mode or in an operational mode; a frequency differentiator having an output coupled to the sleep/wake-up logic, the output presenting output values representative of frequencies at an input of the frequency differentiator; a frequency controllable oscillator coupled to the input of the frequency differentiator; and an external sensor connection adapted for coupling to an external sensor and coupled to the frequency controllable oscillator; wherein the frequency controllable oscillator is at a first frequency when the external sensor is not activated and is at a second frequency when the external sensor is activated, and the frequency differentiator generates a first output value when receiving the first frequency and a second output value when receiving the second frequency; whereby the sleep/wake-up logic does not wake up the circuits and the I/O from the sleep mode when the frequency differentiator output is at the first output value, and the sleep/wake-up logic wakes up the circuits and the I/O from the sleep mode to the operational mode when the frequency differentiator output is at the second output value. The frequency differentiator may comprise: a frequency reference; and a digital comparator having a first input coupled to the frequency reference and a second input coupled to the frequency controllable oscillator, an output of the digital comparator is the frequency differentiator output and produces the first and second output values. The frequency differentiator may comprise: a frequency reference; a multiplexer having a first input coupled to the frequency reference and a second input coupled to the frequency controllable oscillator; and a digital scaler having an input coupled to the multiplexer, an output of the digital scaler is the frequency differentiator output and produces the first and second output values. The frequency differentiator may comprise: a frequency reference; and a digital comparator having a first input coupled to the frequency reference and a second input coupled to the frequency controllable oscillator, an output of the digital comparator is the frequency differentiator output and produces the first and second output values. The frequency differentiator may comprise: a frequency reference; a multiplexer having a first input coupled to the frequency reference and a second input coupled to the frequency controllable oscillator; and a digital scaler having an input coupled to the multiplexer, an output of the digital scaler is the frequency differentiator output and produces the first and second output values. The frequency differentiator may comprise: a frequency-to-voltage converter having an input coupled to the frequency controllable oscillator; a reference voltage; and a voltage comparator having a first input coupled to the frequency-to-voltage converter and a second input coupled to the reference voltage, an output of the voltage comparator is the frequency differentiator output and produces the first and second output values. The frequency differentiator may comprise: a frequency selective filter coupled to the frequency controllable oscillator; and a frequency amplitude detector coupled to the frequency selective filter, an output of the frequency amplitude detector is the frequency differentiator output and produces the first and second output values. The frequency differentiator may comprise: a frequency selective filter coupled to the frequency controllable oscillator; a frequency amplitude rectifier coupled to the frequency selective filter; a reference voltage; and a voltage comparator having a first input coupled to the frequency amplitude rectifier and a second input coupled to the reference voltage, an output of the voltage comparator is the frequency differentiator output and produces the first and second output values. The frequency differentiator may comprise: a counter coupled to the frequency controllable oscillator; a period timer coupled to the counter; a register coupled to the counter and the period timer, an output of the register is the frequency differentiator output and produces the first and second output values.

According to another specific example embodiment of disclosure, a method for waking up circuits of an electronic device when in a low power sleep mode may comprise the steps of: providing circuits and input-output (I/O) capable of being placed in a low power sleep mode; providing sleep/wake-up logic for controlling when the circuits and I/O are in the low power sleep mode or in an operational mode; providing a frequency differentiator capable of determining different frequencies; providing a frequency controllable oscillator that generates first and second frequencies depending upon whether an external sensor is not actuated or actuated, respectively; signaling the sleep/wake-up logic from the frequency differentiator that the frequency controllable oscillator has changed from the first to the second frequency; and waking up the circuits and I/O from the low power sleep mode to the operational mode with the sleep/wake-up logic after the frequency differentiator has determined that the frequency controllable oscillator has changed from the first to the second frequency.

According to yet another specific example embodiment of disclosure, an electronic device having a low power sleep mode may comprise: circuits capable of being placed into a sleep mode; input-output (I/O) capable of being placed into the sleep mode, the I/O coupled to the circuits; sleep/wake-up logic for controlling when the circuits and the I/O are in the sleep mode or in an operational mode; a frequency differentiator having an output coupled to the sleep/wake-up logic, the output presenting output values representative of frequencies at an input of the frequency differentiator; and an external frequency source connection adapted for coupling to an external frequency source and coupled to the input of the frequency differentiator; wherein the frequency differentiator output is at a first output value when the external frequency source is at a first frequency, and the frequency differentiator output is at a second output value when the external frequency source is at a second frequency; whereby the sleep/wake-up logic does not wake up the circuits and the I/O from the sleep mode when the frequency differentiator output is at the first output value, and the sleep/wake-up logic wakes up the circuits and the I/O from the sleep mode to the operational mode when the frequency differentiator output is at the second output value. The frequency differentiator may comprise: a frequency reference; and a digital comparator having a first input coupled to the frequency reference and a second input coupled to the external frequency source connection, an output of the digital comparator is the frequency differentiator output and produces the first and second output values. The frequency differentiator may comprise: a frequency reference; a multiplexer having a first input coupled to the frequency reference and a second input coupled to the external frequency source connection; and a digital scaler having an input coupled to the multiplexer, an output of the digital scaler is the frequency differentiator output and produces the first and second output values. The frequency differentiator may comprise: a frequency-to-voltage converter having an input coupled to the external frequency source connection; a reference voltage; and a voltage comparator having a first input coupled to the frequency-to-voltage converter and a second input coupled to the reference voltage, an output of the voltage comparator is the frequency differentiator output and produces the first and second output values. The frequency differentiator may comprise: a frequency selective filter coupled to the external frequency source connection; and a frequency amplitude detector coupled to the frequency selective filter, an output of the frequency amplitude detector is the frequency differentiator output and produces the first and second output values. The frequency differentiator may comprise: a frequency selective filter coupled to the external frequency source connection; a frequency amplitude rectifier coupled to the frequency selective filter; a reference voltage; and a voltage comparator having a first input coupled to the frequency amplitude rectifier and a second input coupled to the reference voltage, an output of the voltage comparator is the frequency differentiator output and produces the first and second output values. The frequency differentiator may comprise: a counter coupled to the external frequency source connection; a period timer coupled to the counter; a register coupled to the counter and the period timer, an output of the register is the frequency differentiator output and produces the first and second output values.

According to still another specific example embodiment of disclosure, a method for waking up circuits of an electronic device when in a low power sleep mode may comprise the steps of: providing circuits and input-output (I/O) capable of being placed in a low power sleep mode; providing sleep/wake-up logic for controlling when the circuits and I/O are in the low power sleep mode or in an operational mode; providing a frequency differentiator capable of determining when an external frequency source changes from a first frequency to a second frequency; signaling the sleep/wake-up logic from the frequency differentiator that the external frequency source has changed from the first to the second frequency; and waking-up the circuits and I/O from the low power sleep mode to the operational mode with the sleep/wake-up logic after the frequency differentiator has determined that the external frequency source has changed from the first to the second frequency.

According to another specific example embodiment of disclosure, an electronic device having a low power sleep mode may comprise: circuits capable of being placed into a sleep mode; input-output (I/O) capable of being placed into the sleep mode, the I/O coupled to the circuits; sleep/wake-up logic for controlling when the circuits and the I/O are in the sleep mode or in an operational mode; a frequency differentiator having an output coupled to the circuits, the output presenting output values representative of frequencies at an input of the frequency differentiator; a frequency controllable oscillator coupled to the input of the frequency differentiator; an external sensor connection adapted for coupling to an external sensor and coupled to the frequency controllable oscillator; wherein the frequency controllable oscillator is at a first frequency when the external sensor is not activated and is at a second frequency when the external sensor is activated, and the frequency differentiator generates a first output value when receiving the first frequency and a second output value when receiving the second frequency; and a watchdog timer coupled to the sleep/wake-up logic, wherein the watchdog timer periodically causes the sleep/wake-up logic to wake up the circuits and the I/O from the sleep mode to the operational mode for a certain time so that the circuits can sample the output values from the frequency differentiator, wherein when a present output value sample is different then a prior output value sample, then the circuits and the I/O will remain in the operational mode. The prior output value sample may comprise an average value of a plurality of prior output value samples taken. The certain time that the circuits and output are in the operational mode is substantially less time than when the circuits and the I/O are in the sleep mode. The frequency differentiator may comprise: a frequency reference; and a digital comparator having a first input coupled to the frequency reference and a second input coupled to the frequency controllable oscillator, an output of the digital comparator is the frequency differentiator output and produces the first and second output values. The frequency differentiator may comprise: a frequency reference; a multiplexer having a first input coupled to the frequency reference and a second input coupled to the frequency controllable oscillator; and a digital scaler having an input coupled to the multiplexer, an output of the digital scaler is the frequency differentiator output and produces the first and second output values. The frequency differentiator may comprise: a frequency-to-voltage converter having an input coupled to the frequency controllable oscillator; a reference voltage; and a voltage comparator having a first input coupled to the frequency-to-voltage converter and a second input coupled to the reference voltage, an output of the voltage comparator is the frequency differentiator output and produces the first and second output values. The frequency differentiator may comprise: a frequency selective filter coupled to the frequency controllable oscillator; and a frequency amplitude detector coupled to the frequency selective filter, an output of the frequency amplitude detector is the frequency differentiator output and produces the first and second output values. The frequency differentiator may comprise: a frequency selective filter coupled to the frequency controllable oscillator; a frequency amplitude rectifier coupled to the frequency selective filter; a reference voltage; and a voltage comparator having a first input coupled to the frequency amplitude rectifier and a second input coupled to the reference voltage, an output of the voltage comparator is the frequency differentiator output and produces the first and second output values. The frequency differentiator may comprise: a counter coupled to the frequency controllable oscillator; a period timer coupled to the counter; a register coupled to the counter and the period timer, an output of the register is the frequency differentiator output and produces the first and second output values.

According to yet another specific example embodiment of disclosure, a method for waking up circuits of an electronic device when in a low power sleep mode may comprise the steps of: providing circuits and input-output (I/O) capable of being placed into a low power sleep mode; providing sleep/wake-up logic for controlling when the circuits and I/O are in the low power sleep mode or in an operational mode; providing a frequency controllable oscillator that generates first and second frequencies depending upon whether an external sensor is not actuated or actuated, respectively; providing a frequency differentiator capable of determining different frequencies; providing a watchdog timer for periodically waking up the circuits and I/O for a certain time so that the circuits can sample the frequency differentiator, wherein when a present frequency differentiator sample is different then a prior frequency differentiator sample, then the circuits and the I/O will remain in the operational mode. The prior frequency differentiator sample may comprise an average value of a plurality of prior frequency differentiator samples taken. The certain time that the circuits and output are in the operational mode may be substantially less time than when the circuits and the I/O are in the sleep mode.

According to another specific example embodiment of disclosure, an electronic device having a low power sleep mode may comprise: circuits capable of being placed in a sleep mode; input-output (I/O) capable of being placed in the sleep mode, the I/O coupled to the circuits; sleep/wake-up logic for controlling when the circuits and the I/O are in the sleep mode or in an operational mode; a frequency differentiator having an output coupled to the circuits, the output presenting output values representative of frequencies at an input of the frequency differentiator; an external frequency source connection adapted for coupling to an external frequency source and coupled to the input of the frequency differentiator; wherein the frequency differentiator output is at a first output value when the external frequency source is at a first frequency, and the frequency differentiator output is at a second output value when the external frequency source is at a second frequency; and a watchdog timer coupled to the sleep/wake-up logic, wherein the watchdog timer periodically causes the sleep/wake-up logic to wake up the circuits and the I/O from the sleep mode to the operational mode for a certain time so that the circuits can sample the output values from the frequency differentiator, wherein when a present output value sample is different then a prior output value sample, then the circuits and the I/O will remain in the operational mode. The prior output value sample comprises an average value of a plurality of prior output value samples taken. The certain time that the circuits and output are in the operational mode is substantially less time than when the circuits and the I/O are in the sleep mode. The frequency differentiator may comprise: a frequency reference; and a digital comparator having a first input coupled to the frequency reference and a second input coupled to the external frequency source connection, an output of the digital comparator is the frequency differentiator output and produces the first and second output values. The frequency differentiator may comprise: a frequency reference; a multiplexer having a first input coupled to the frequency reference and a second input coupled to the external frequency source connection; and a digital scaler having an input coupled to the multiplexer, an output of the digital scaler is the frequency differentiator output and produces the first and second output values. The frequency differentiator may comprise: a frequency-to-voltage converter having an input coupled to the external frequency source connection; a reference voltage; and a voltage comparator having a first input coupled to the frequency-to-voltage converter and a second input coupled to the reference voltage, an output of the voltage comparator is the frequency differentiator output and produces the first and second output values. The frequency differentiator may comprise: a frequency selective filter coupled to the external frequency source connection; and a frequency amplitude detector coupled to the frequency selective filter, an output of the frequency amplitude detector is the frequency differentiator output and produces the first and second output values. The frequency differentiator may comprise: a frequency selective filter coupled to the external frequency source connection; a frequency amplitude rectifier coupled to the frequency selective filter; a reference voltage; and a voltage comparator having a first input coupled to the frequency amplitude rectifier and a second input coupled to the reference voltage, an output of the voltage comparator is the frequency differentiator output and produces the first and second output values. The frequency differentiator may comprise: a counter coupled to the external frequency source connection; a period timer coupled to the counter; a register coupled to the counter and the period timer, an output of the register is the frequency differentiator output and produces the first and second output values.

According to still another specific example embodiment of disclosure, a method for waking up circuits of an electronic device when in a low power sleep mode may comprise the steps of: providing circuits and input-output (I/O) capable of being placed in a low power sleep mode; providing sleep/wake-up logic for controlling when the circuits and I/O are in the low power sleep mode or in an operational mode; providing a frequency differentiator having a first or second output value depending upon whether an external frequency source is at a first or second frequency, respectively; providing a watchdog timer for periodically causing the sleep/wake-up logic to wake up the circuits and the I/O from the sleep mode to the operational mode for a certain time so that the circuits can sample the output values from the frequency differentiator, wherein when a present output value sample is different then a prior output value sample, then the circuits and the I/O will remain in the operational mode. The prior frequency differentiator sample may comprise an average value of a plurality of prior frequency differentiator samples taken. The certain time that the circuits and output are in the operational mode may be substantially less time than when the circuits and the I/O are in the sleep mode.

BRIEF DESCRIPTION OF THE DRAWINGS

A more complete understanding of the present disclosure may be acquired by referring to the following description taken in conjunction with the accompanying drawings wherein.

Figure 1:
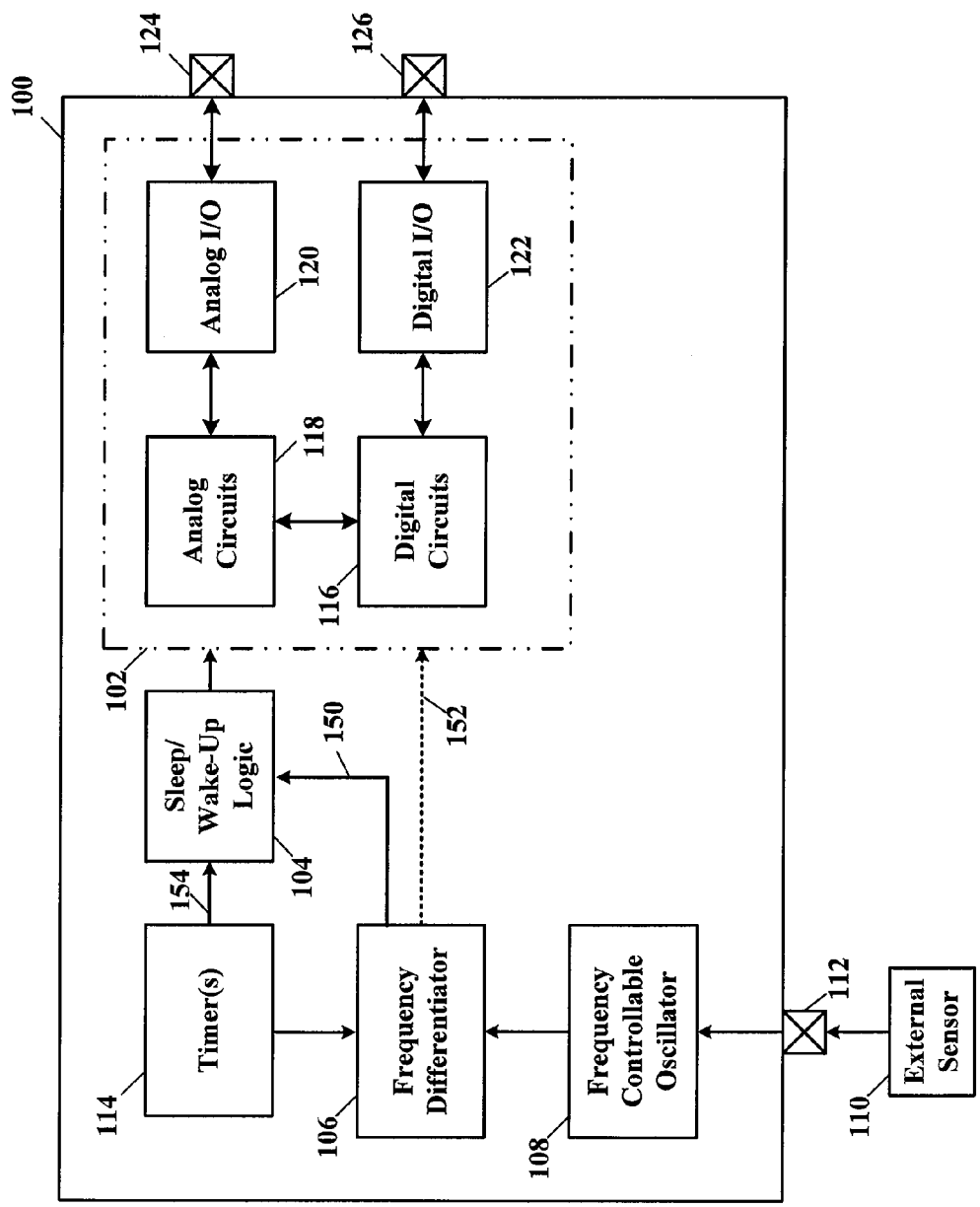
FIG. 1 is a schematic block diagram of an electronic device having a capability to wake-up from a low power sleep mode upon/for detection of a frequency change caused by activation of an external sensor, according to specific example embodiments of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawing, the details of specific example embodiments are schematically illustrated. Like elements in the drawings will be represented by like numbers, and similar elements will be represented by like numbers with a different lower case letter suffix.

Referring to FIG. 1, depicted is a schematic block diagram of an electronic device having a capability to wake-up from a low power sleep mode upon/for detection of a frequency change caused by activation of an external sensor, according to specific example embodiments of this disclosure. An electronic device 100 comprises circuits and input-output (I/O) 102 that can be placed into a low power sleep mode for conservation of power, e.g., when powered by a battery source. The power controllable circuits and input-output (I/O) 102 comprise digital circuits 116 and digital I/O 122 coupled to an external connection(s) 126. The power controllable circuits and input-output (I/O) 102 may further comprise analog circuits 118 and analog I/O 120 coupled to an external connection(s) 124.

The electronic device 100 further comprises sleep/wake-up logic 104, a timer(s) 114, a frequency differentiator 106 and a frequency controllable oscillator 108. The sleep/wake-up logic 104 controls the sleep/wake-up modes of the power controllable circuits and input-output (I/O) 102. The sleep/wake-up logic 104 may be activated by an input, e.g., an interrupt, such as a signal on an output 150 from the frequency differentiator 106 upon detection of a frequency change event.

The sleep/wake-up logic 104 also may be activated by a wake-up signal from the timer(s) 114. The timer(s) 114 may be a standard watchdog timer (WDT) as commonly available in many electronic devices 100. The timer(s) 114 may be set for a very low duty cycle wake-up of the electronic device 100 in order to conserve power.

The electronic device 100 may comprise at least one integrated circuit die packaged in an integrated circuit package (not shown).

The frequency controllable oscillator 108 is coupled to an external sensor 110 through an external sensor connection 112. The external sensor 110 may be, for example but not limited to, a capacitive sensor that changes its capacitance value when in proximity to an object, e.g., a finger of a person actuating a push button or touch pad. Since the external sensor 110 is part of the frequency determining circuit of the frequency controllable oscillator 108, actuating the external sensor 110 will change the frequency of the frequency controllable oscillator 108. This change in frequency will be detected by the frequency differentiator 106, and upon detection of the change in frequency, the frequency differentiator 106 will cause (as indicated by signal line 150) the sleep/wake-up logic 104 to wake-up the power controllable circuits and input-output (I/O) 102 from a low power deep sleep mode.

In addition or alternatively to, the timer(s) 114 may cause (as indicated by signal line 154) the sleep/wake-up logic 104 to wake-up the power controllable circuits and input-output (I/O) 102 from a low power deep sleep mode. Once the power controllable circuits and input-output (I/O) 102 are operational, the output 152 from the frequency differentiator 106 may be sampled by the digital circuits 116 or the analog circuits 118 to determine whether a frequency change has occurred since the last sample taken and/or a running average of the previous samples taken. A comparison can then be made with a software/firmware program running in the digital circuits 116, e.g., digital processor. The program running in the digital circuits 116 may have a finer frequency differentiation resolution then does the frequency differentiator 106, thus sensing of a smaller frequency change, for example, a slight change of the external sensor parameter may indicate an actuation becoming eminent, e.g., a finger is drawing nearer to a capacitive touch sensor before actual physical contact thereto.

The frequency differentiator 106 may comprise a frequency discriminator that has different analog (see FIGS. 4, 5 and 6) or digital (see FIGS. 2, 3, 7 and 8) outputs for different input frequencies. Upon a predetermined change in an output value from the frequency differentiator 106, the sleep/wake-up logic 104 may be alerted to wake-up the power controllable circuits and input-output (I/O) 102. As described hereinabove, the timer(s) 114 may be used to initiate the wake-up signal (e.g., interrupt) to the sleep/wake-up logic 104, then the present sample of the detected frequency output information from the frequency differentiator 106 is determined by the digital circuits 116 as to whether the present sample of the detected frequency output information is sufficiently different from a past sample so as to create a programmed event to occur, e.g., response to the external sensor 110 stimulus.

It is contemplated and within the scope of this disclosure that the frequency differentiator 106 and/or frequency controllable oscillator 108 may be configured from existing circuits within the electronic device 100 that operate whether or not the power controllable circuits and input-output (I/O) 102 are in a deep sleep mode. Some circuits that do not change operation in or out of a deep sleep mode may be a watchdog timer (WDT) oscillator and/or a watchdog counter. These watchdog circuits are readily found in existing electronic devices and thus may be configured according to the teachings of this disclosure. The digital circuits 116 may comprise a digital processor, e.g., microprocessor, microcontroller, digital signal processor, programmable logic array and the like, and memory, e.g., volatile and/or non-volatile memories. The volatile memory may be static or dynamic random access memory and the like, and the non-volatile memory may be read only memory, FLASH memory, electrically erasable and programmable read only memory (EEPROM) and the like.

The external sensor 110 and frequency differentiator may also be utilized when the power controllable circuits and input-output (I/O) 102 are in an operational mode, e.g., further inputs such as from, for example but not limited to, a keypad (not shown) (the external sensor may be multi-bit, either serial or parallel).

Figure 2:
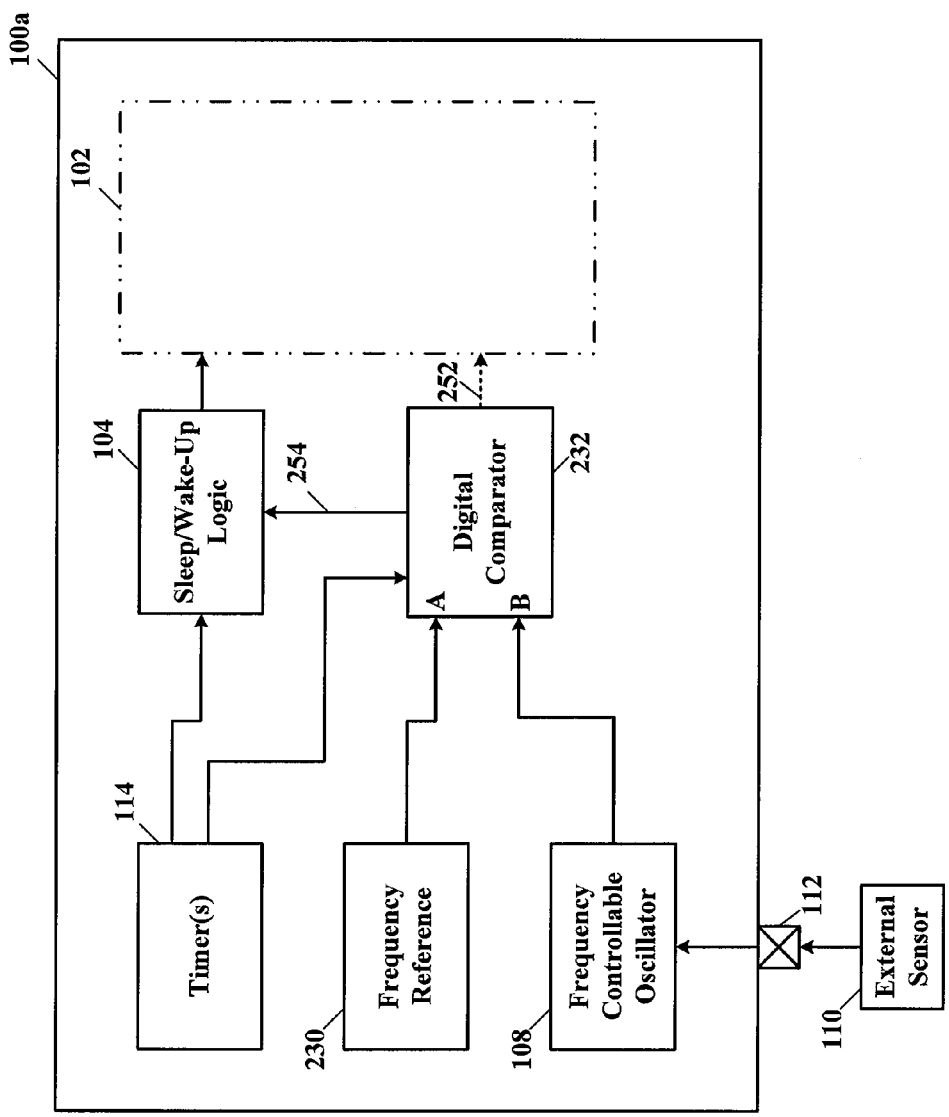
FIG. 2 is a schematic block diagram of an implementation of a specific example embodiment of the frequency change detection circuit of FIG. 1.

Referring to FIG. 2, depicted is a schematic block diagram of an implementation of a specific example embodiment of the frequency change detection circuit of FIG. 1. The frequency controllable oscillator 108 operates as described hereinabove. A frequency reference 230 is coupled to a first input of a digital comparator 232 and the frequency controllable oscillator 108 is coupled to a second input of the digital comparator 232. The frequency of the frequency reference 230 may be either above or below the frequency of the frequency controllable oscillator 108 when the external sensor 110 is not activated and the relationship of these frequencies will be reversed when the external sensor 110 is activated. Upon the reversal of these frequencies, the output of the digital comparator 232 will change logic levels, e.g., go from a logic high to a logic low or visa versa. The timer(s) 114 may be used to trigger latched samples of the output values from the frequency reference 230 and frequency controllable oscillator 108 so that a store and compare may be preformed thereon by the digital comparator 232, and the comparison output 254 remains stable to the sleep/wake-up logic 104.

This logic level change will alert (interrupt) the sleep/wake-up logic 104 so that the power controllable circuits and input-output (I/O) 102 will wake-up and come out of the low power sleep mode. Alternatively or in addition to, the output 252 of the digital comparator 232 may be sampled by some of the circuits of the power controllable circuits and input-output (I/O) 102 when woken-up by the sleep/wake-up logic 104. As described hereinabove, the timer(s) 114 may be used to initiate the wake-up signal (e.g., interrupt) to the sleep/wake-up logic 104. Whereby when the power controllable circuits and input-output (I/O) 102 are operational, the output 252 from the digital comparator 232 may be sampled by the digital circuits 116 to determine whether a frequency change has occurred since the last sample taken and/or a running average of the previous samples taken. A comparison can then be made with a software/firmware program running in the digital circuits 116, e.g., digital processor. Low duty cycle sampling will help to conserve power of the electronic device 100a.

Figure 3:
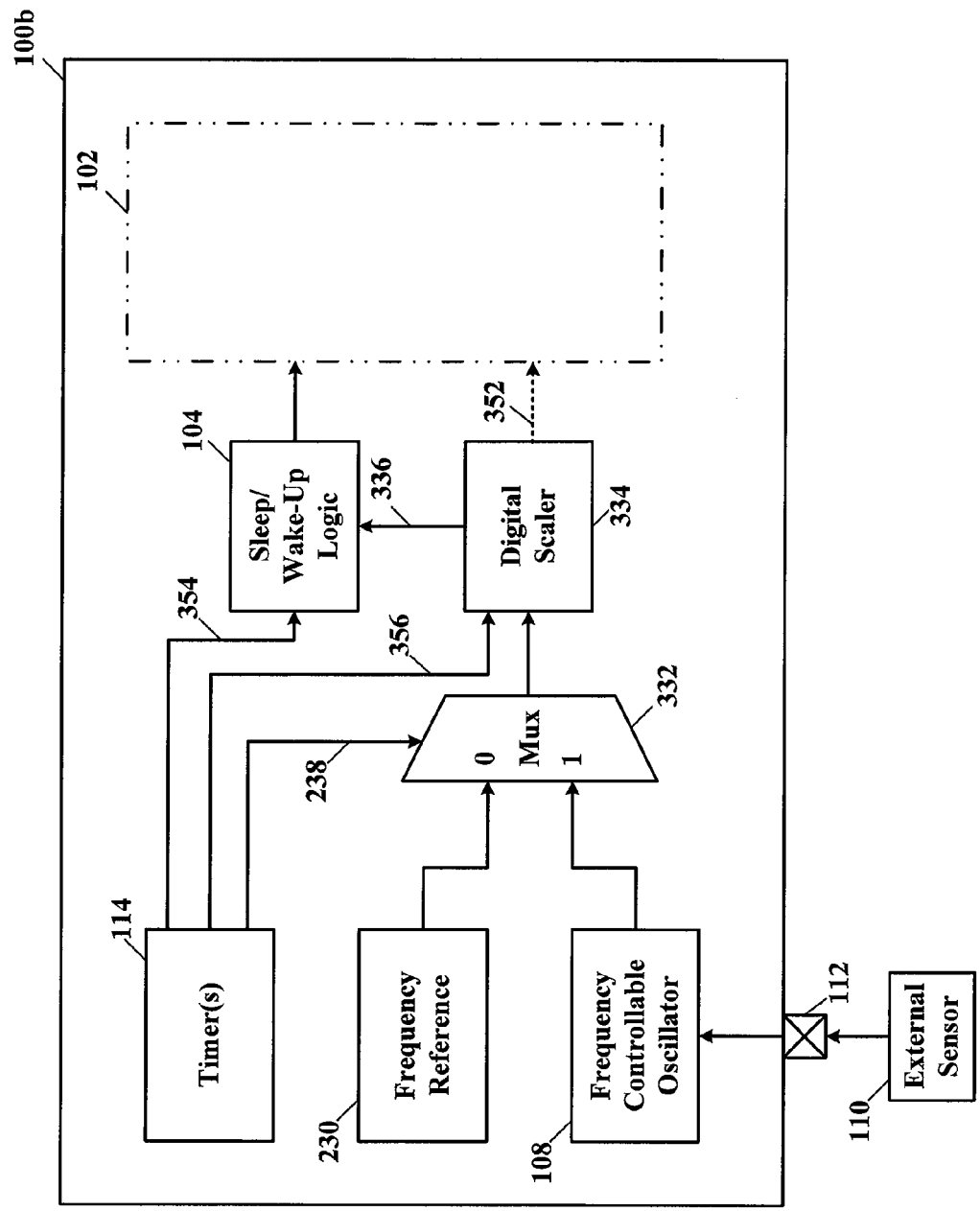
FIG. 3 is a schematic block diagram of an implementation of another specific example embodiment of the frequency change detection circuit of FIG. 1.

Referring to FIG. 3, depicted is a schematic block diagram of an implementation of another specific example embodiment of the frequency change detection circuit of FIG. 1. The frequency controllable oscillator 108 operates as described hereinabove. A frequency reference 230 is coupled to a first input of a multiplexer 332 and the frequency controllable oscillator 108 is coupled to a second input of the multiplexer 332. The frequency of the frequency reference 230 may be either above or below the frequency of the frequency controllable oscillator 108 when the external sensor 110 is not activated and the relationship of these frequencies will be reversed when the external sensor 110 is activated. The digital scaler 334 loads one of the frequencies from either the frequency reference 230 or the frequency controllable oscillator 108 as a preset count and then may count down this preset count while comparing it to the frequency from the other source (via the multiplexer 332). When there is a difference caused by the external sensor 110 changing the frequency of the frequency controllable oscillator 108, the digital scaler 334 will change logic levels, e.g., go from a logic high to a logic low or visa versa. This logic level change will alert (interrupt) the sleep/wake-up logic 104 so that the power controllable circuits and input-output (I/O) 102 will wake-up and come out of the sleep mode.

The timer(s) 114 may be used to control the multiplexer 332 through control line 238. The timer(s) 114 may cause (as indicated by signal line 354) the sleep/wake-up logic 104 to wake-up the power controllable circuits and input-output (I/O) 102 from a low power deep sleep mode. Once the power controllable circuits and input-output (I/O) 102 are operational, values from the output 352 of the digital scaler 334 may be sampled by the digital circuits 116 to determine whether a frequency change has occurred since the last sample taken and/or a running average of the previous samples taken. A comparison can then be made with a software/firmware program running in the digital circuits 116, e.g., a digital processor. The timer(s) 114 may also control the operational timing of the digital scaler 334, as indicated by control line 356.

Figure 4:
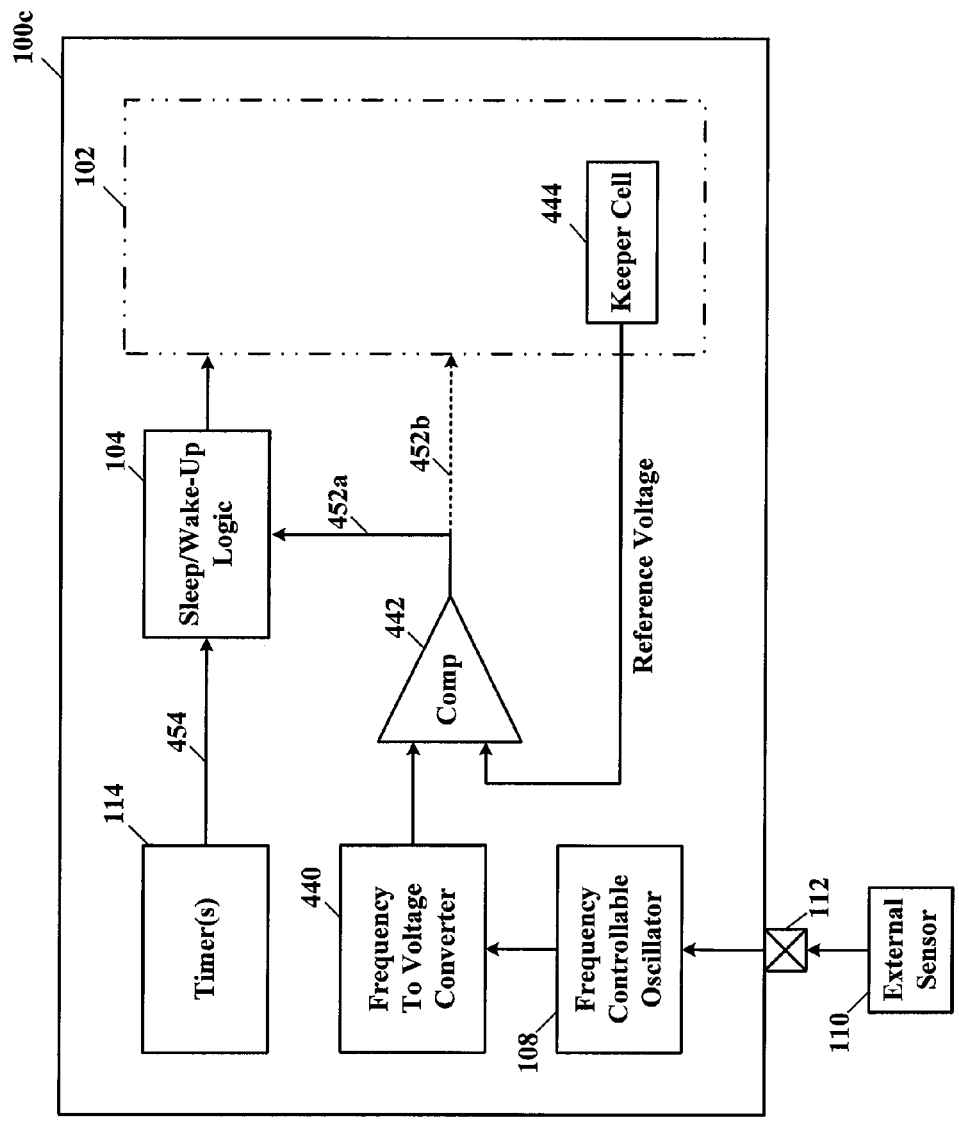
FIG. 4 is a schematic block diagram of an implementation of still another specific example embodiment of the frequency change detection circuit of FIG. 1.

Referring to FIG. 4, depicted is a schematic block diagram of an implementation of still another specific example embodiment of the frequency change detection circuit of FIG. 1. The frequency controllable oscillator 108 operates as described hereinabove. The output of the frequency controllable oscillator 108 is coupled to a frequency input of a frequency-to-voltage converter 440. The frequency-to-voltage converter 440 converts the frequency from the frequency controllable oscillator 108 to an analog direct current (DC) voltage that is coupled to a first input of an analog voltage comparator 442. A second input of the analog voltage comparator 442 is coupled to a reference voltage, e.g., from an analog keeper cell 444 of the power controllable circuits and input-output (I/O) 102. The voltage on the first input of the voltage comparator 442 may be greater than or less than the voltage on the second input of the voltage comparator 442 when the external sensor 110 is not activated (the frequency controllable oscillator 108 is at a first frequency).

When the external sensor 110 is activated (the frequency controllable oscillator 108 is at a second frequency), the voltages on the first and second inputs of the voltage comparator 442 will reverse amplitude levels and thus cause the output 452a of the voltage comparator 442 to change logic levels, e.g., from high to low or visa versa. This logic level change will alert (interrupt) the sleep/wake-up logic 104 so that the power controllable circuits and input-output (I/O) 102 will wake-up and come out of the low power sleep mode. The keeper cell 444 maintains the reference voltage while the power controllable circuits and input-output (I/O) 102 are in a low power sleep mode. The reference voltage may be adjusted for reliable operation as described hereinabove.

Alternatively or in addition to, the timer(s) 114 may cause (as indicated by signal line 454) the sleep/wake-up logic 104 to wake-up the power controllable circuits and input-output (I/O) 102 from a low power deep sleep mode. Once the power controllable circuits and input-output (I/O) 102 are operational, the output 452b from the frequency differentiator 106 may be sampled by the digital circuits 116 or the analog circuits 118 to determine whether a frequency change has occurred since the last sample taken and/or a running average of the previous samples taken. A comparison can then be made with a software/firmware program running in the digital circuits 116, e.g., a digital processor.

Figure 5:
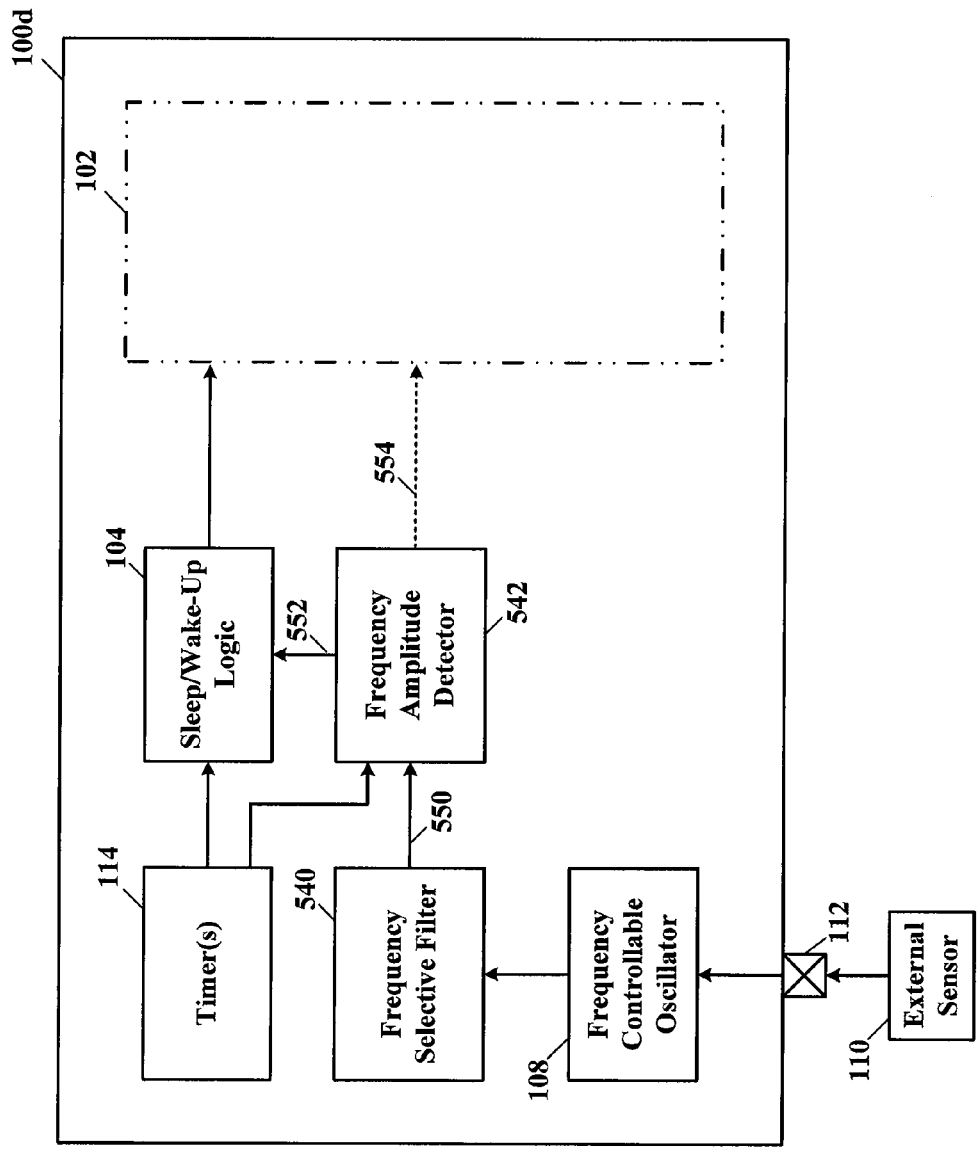
FIG. 5 is a schematic block diagram of an implementation of yet another specific example embodiment of the frequency change detection circuit of FIG. 1.

Referring to FIG. 5, depicted is a schematic block diagram of an implementation of yet another specific example embodiment of the frequency change detection circuit of FIG. 1. The frequency controllable oscillator 108 operates as described hereinabove. A frequency selective filter 540 is coupled to the output of the frequency controllable oscillator 108. The frequency selective filter 540 may be a low-pass, high-pass or band-pass frequency filter such that when the frequency controllable oscillator 108 is at a first frequency, e.g., the external sensor 110 is not activated, the output 550 of the frequency selective filter 540 is at a first amplitude level, and when the frequency controllable oscillator 108 is at a second frequency, e.g., the external sensor 110 is activated, the output 550 of the frequency selective filter 540 is at a second amplitude level. The first amplitude level may be less than the second amplitude level or visa versa.

The output 540 of the frequency selective filter 540 (either the first or second amplitude level depending upon whether or not the external sensor 110 is activated) is coupled to a frequency amplitude detector 542 such that when the first amplitude level is detected by the frequency amplitude detector 542 a first logic level is generated at the output 552 thereof. When the second amplitude level is detected by the frequency amplitude detector 542 a second logic level is generated at the output 552 thereof. This change in logic levels, e.g., going from a logic high to a logic low or visa versa, will alert (interrupt) the sleep/wake-up logic 104 so that the power controllable circuits and input-output (I/O) 102 will wake-up and come out of the sleep mode.

Alternatively or in addition to, the output 554 of the frequency amplitude detector 542 may be sampled by some of the circuits of the power controllable circuits and input-output (I/O) 102 when woken-up by the sleep/wake-up logic 104. As described hereinabove, the timer(s) 114 may be used to initiate the wake-up signal (e.g., interrupt) to the sleep/wake-up logic 104. Whereby when the power controllable circuits and input-output (I/O) 102 are operational, the output 554 from the frequency amplitude detector 542 may be sampled by the digital circuits 116 or the analog circuits 118 to determine whether a frequency change has occurred since the last sample taken and/or a running average of the previous samples taken. A comparison can then be made with a software/firmware program running in the digital circuits 116, e.g., a digital processor. Low duty cycle sampling will help to conserve power of the electronic device 100d.

Figure 6:
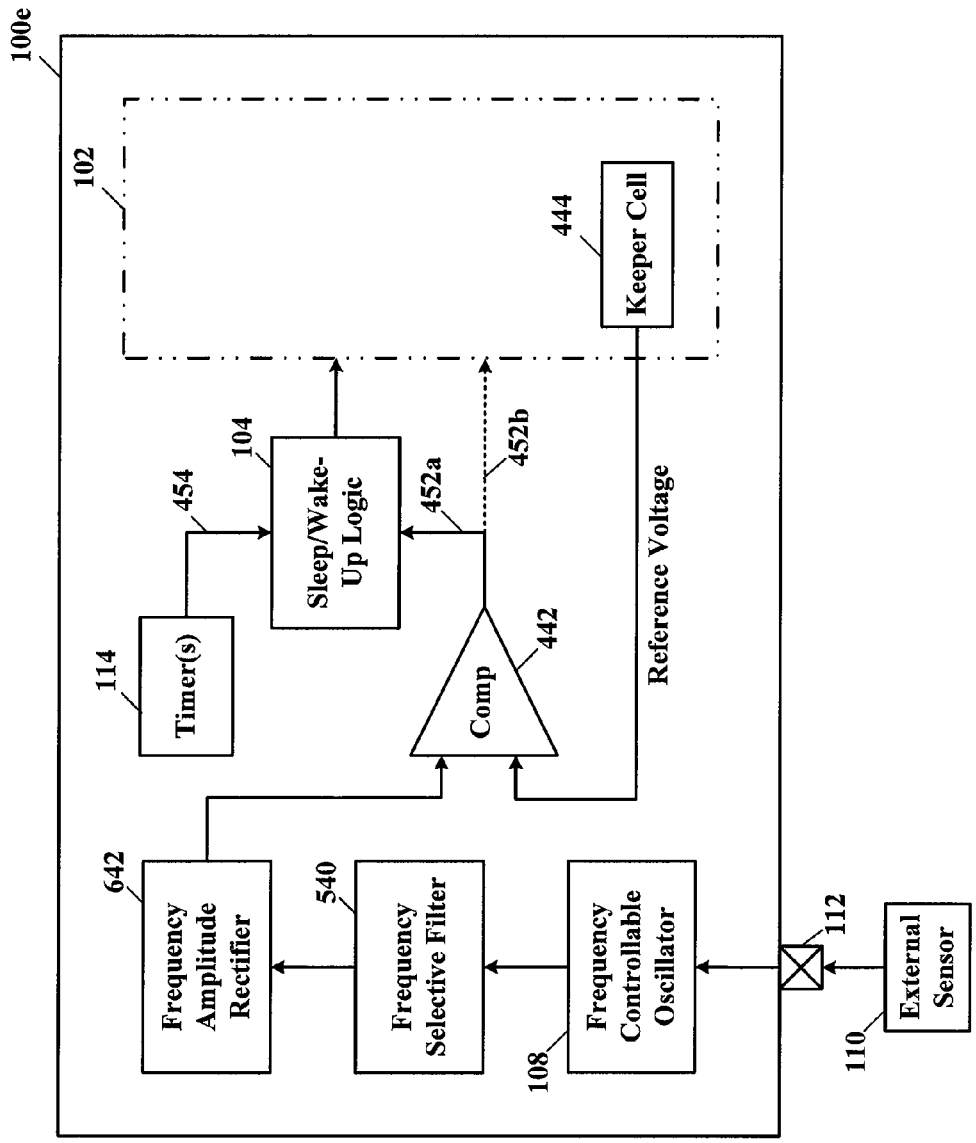
FIG. 6 is a schematic block diagram of an implementation of still another specific example embodiment of the frequency change detection circuit of FIG. 1.

Referring to FIG. 6, depicted is a schematic block diagram of an implementation of still another specific example embodiment of the frequency change detection circuit of FIG. 1. The frequency controllable oscillator 108 operates as described hereinabove. A frequency selective filter 540 is coupled to the output of the frequency controllable oscillator 108. The frequency selective filter 540 may be a low pass, high pass or band pass frequency filter such that when the frequency controllable oscillator 108 is at a first frequency, e.g., the external sensor 110 is not activated, the output of the frequency selective filter 540 is at a first amplitude level, and when the frequency controllable oscillator 108 is at a second frequency, e.g., the external sensor 110 is activated, the output of the frequency selective filter 540 is at a second amplitude level. The first amplitude level may be less than the second amplitude level or visa versa.

The output of the frequency selective filter 540 (either the first or second amplitude level depending upon whether or not the external sensor 110 is activated) is coupled to a frequency amplitude rectifier 642 such that when the first amplitude level is detected by the frequency amplitude rectifier 642 a first analog voltage level is generated at the output thereof. When the second amplitude level is detected by the frequency amplitude rectifier 642 a second analog voltage level is generated at the output thereof. The first analog voltage level may be greater than the second analog voltage level or visa versa. The output of the frequency amplitude rectifier 642 is coupled to a first input of an analog voltage comparator 442. A second input of the analog voltage comparator 442 is coupled to a reference voltage, e.g., from an analog keeper cell 444 of the power controllable circuits and input-output (I/O) 102. The voltage on the first input of the voltage comparator 442 may be greater than or less than the voltage on the second input of the voltage comparator 442 when the external sensor 110 is not activated (the frequency controllable oscillator 108 is at a first frequency).

When the external sensor 110 is activated (the frequency controllable oscillator 108 is at a second frequency), the voltages on the first and second inputs of the voltage comparator 442 will change voltage amplitude levels and thus cause the output of the voltage comparator 442 to change logic levels, e.g., from high to low or visa versa. This logic level change will alert (interrupt) the sleep/wake-up logic 104 so that the power controllable circuits and input-output (I/O) 102 will wake-up and come out of the sleep mode. The keeper cell 444 maintains the reference voltage while the power controllable circuits and input-output (I/O) 102 is in a low power sleep mode. The reference voltage may be adjusted for reliable operation as described hereinabove.

Alternatively or in addition to, the timer(s) 114 may cause (as indicated by signal line 454) the sleep/wake-up logic 104 to wake-up the power controllable circuits and input-output (I/O) 102 from a low power deep sleep mode. Once the power controllable circuits and input-output (I/O) 102 are operational, the output 452b from the voltage comparator 442 may be sampled by the digital circuits 116 or the analog circuits 118 to determine whether a frequency change has occurred since the last sample taken and/or a running average of the previous samples taken. A comparison can then be made with a software/firmware program running in the digital circuits 116, e.g., a digital processor.

Figure 7:
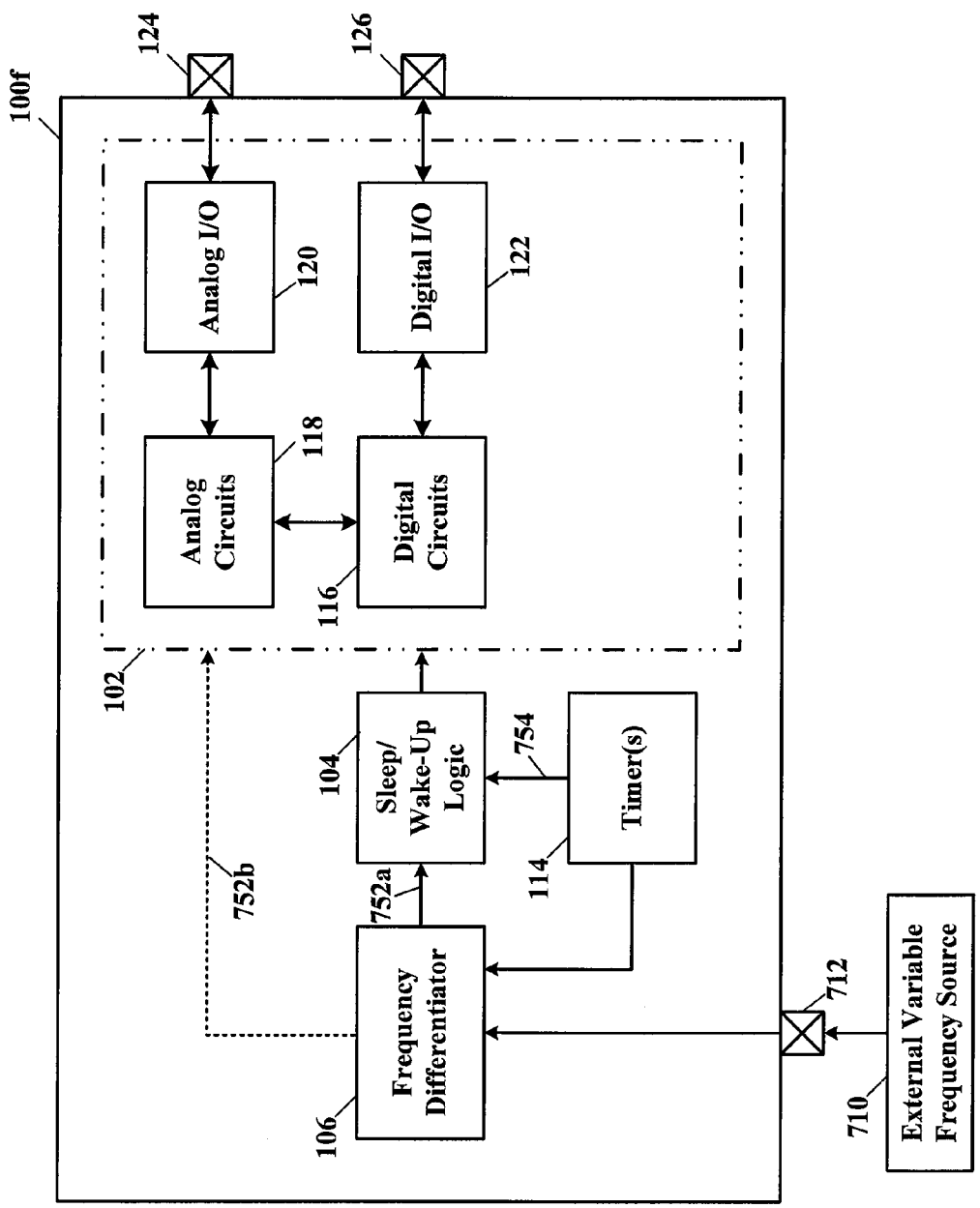
FIG. 7 is a schematic block diagram of an electronic device having a capability to wake-up from a low power sleep mode upon/for detection of a frequency change from an external frequency source, according to specific example embodiments of this disclosure.

Referring to FIG. 7, depicted is a schematic block diagram of an electronic device having a capability to wake-up from a low power sleep mode upon/for detection of a frequency change from an external frequency source, according to specific example embodiments of this disclosure. An electronic device 100f comprises circuits and input-output (I/O) 102 that can be placed into a low power sleep mode for conservation of power, e.g., when powered by a battery source. The power controllable circuits and input-output (I/O) 102 comprise digital circuits 116 and digital I/O 122 coupled to an external connection(s) 126. The power controllable circuits and input-output (I/O) 102 may further comprise analog circuits 118 and analog I/O 120 coupled to an external connection(s) 124. The electronic device 100f further comprises sleep/wake-up logic 104 and a frequency differentiator 106. The sleep/wake-up logic 104 controls the sleep/wake-up modes of the power controllable circuits and input-output (I/O) 102. The sleep/wake-up logic 104 may be activated by an input, e.g., an interrupt, such as an output signal from the frequency differentiator 106 upon detection of a frequency change event. The electronic device 100f may comprise at least one integrated circuit die packaged in an integrated circuit package (not shown).

The frequency differentiator 106 is coupled to an external variable frequency source 710 through an external connection 712. The external variable frequency source 710 may be, for example but not limited to, a frequency shift keying (FSK) signal, a frequency modulation (FM) signal, a pulse train such as a pulse width modulation (PWM) signal, etc. Whenever the external variable frequency source 710 changes frequency, that frequency change will be detected by the frequency differentiator 106, and upon detection of the change in frequency, the frequency differentiator 106 will cause the sleep/wake-up logic 104 to wake-up the power controllable circuits and input-output (I/O) 102 from a low power deep sleep mode.

In addition or alternatively to, the timer(s) 114 may cause (as indicated by signal line 754) the sleep/wake-up logic 104 to wake-up the power controllable circuits and input-output (I/O) 102 from a low power deep sleep mode. Once the power controllable circuits and input-output (I/O) 102 are operational, the output 752b from the frequency differentiator 106 may be sampled by the digital circuits 116 or the analog circuits 118 to determine whether a frequency change has occurred since the last sample taken and/or a running average of the previous samples taken. A comparison can then be made with a software/firmware program running in the digital circuits 116, e.g., a digital processor.

The embodiment shown in FIG. 7 has many applications such as in communication systems to detect changes in the communication clock frequency and/or in the data frequency, such as the aforementioned FSK and FM based systems, and in addition has application to Ethernet, and Wi-Fi systems, etc. Some of these applications may be general (watching a communication clock), or implementation specific (watching a datastream for changes that can be detected in the frequency domain, and might, for example, indicate the start of a new packet). This functionality may be used to detect (and wake up/interrupt the electronic device 100f) when a communication link goes (in)active, or if a new frame/packet/transmission is detected.

This functionality is not limited to communication systems, and will be useful in any application where signals of a regular frequency are generated and there is information contained in the frequency (e.g., that it means something if the frequency changes). For example:

- Range finding (interrupt when the targets gets closer than a preset distance)
- Switch mode power supplies (interrupt when switching frequency gets too high/low.)
- Fan speed controllers (interrupt when fan speed gets too high/low)
- Reducing chatter in feedback control systems that use comparators (slow down the switching speed when the switching frequency gets too high—reduces EMI)
- General supervision of systems with a regular frequency component (watching an AC supply for example, or making sure a fan/motor/power supply is getting switched to generate interrupt/wake-up when a failure is detected)

It is contemplated and within the scope of this disclosure that any of the specific example embodiments of the frequency differentiation circuits shown in FIGS. 2-6 and 8 as disclosed herein, may be used with the specific example embodiment of FIG. 7. It is also contemplated and within the scope of this disclosure that the frequency differentiator 106 may be configured from existing circuits within the electronic device 100f that operate whether or not the power controllable circuits and input-output (I/O) 102 are in a deep sleep mode. Some circuits that do not change operation in or out of a deep sleep mode may be a watchdog timer oscillator and/or a watchdog counter. These watchdog circuits are readily found in existing electronic devices and thus may be configured according to the teachings of this disclosure. The digital circuits 116 may comprise a digital processor, e.g., microprocessor, microcontroller, digital signal processor, programmable logic array and the like, and memory, e.g., volatile and/or non-volatile memories. The volatile memory may be static or dynamic random access memory and the like, and the non-volatile memory may be read only memory, FLASH memory, electrically erasable and programmable read only memory (EEPROM) and the like.

Figure 8:
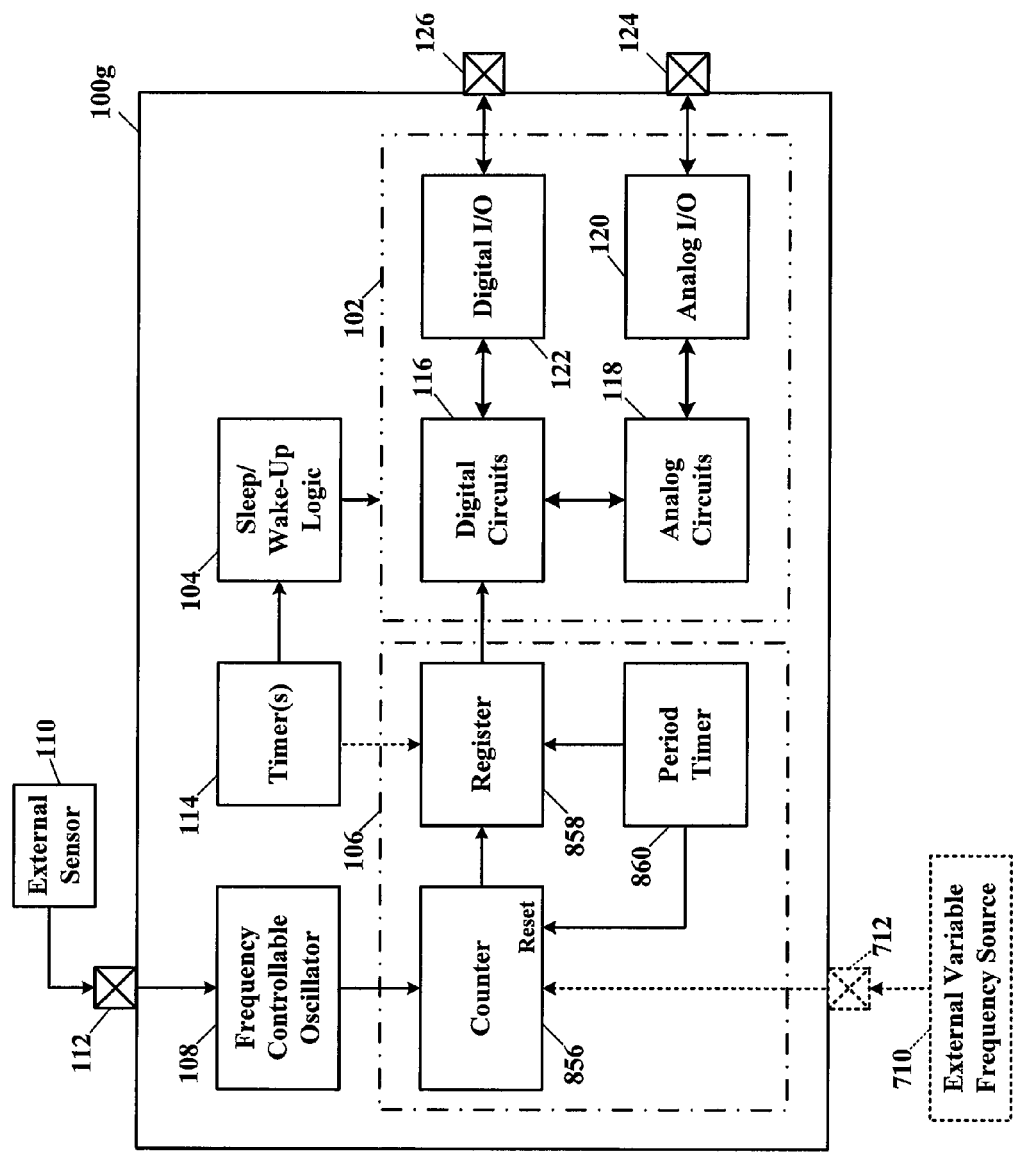
FIG. 8 is a schematic block diagram of a frequency counter implementation for the frequency differentiator of the specific example embodiments of this disclosure.

Referring to FIG. 8, depicted is a schematic block diagram of a frequency counter implementation for the frequency differentiator of the specific example embodiments of this disclosure. The frequency differentiator 106 may comprise a counter 856, a register 858 and a period timer 860. The register 858 stores a count value from the counter 856. The count value of the counter 856 is representative of a frequency from the external variable frequency source 710 (or an external sensor 110 in combination with an internal oscillator 108). The output from the register 858 may be sampled by the digital circuits 116 and thereby processed as described hereinabove. The power controllable circuits and input-output (I/O) 102 may be awoken by the sleep/wake-up logic 104 and/or the timer(s) 114 as described hereinabove.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for waking up circuits of an electronic device when in a low power sleep mode, the method comprising the steps of:
    placing circuits and input-outputs coupled to the circuits into the low power sleep mode and feeding an output signal of an external frequency controllable oscillator to a first input of a frequency differentiator and coupling a second input of said frequency differentiator with a reference oscillator;
    waking-up the circuits and I/O from the low power sleep mode to the operational mode with the sleep/wake-up logic after the frequency differentiator has determined that the external frequency source has changed from the first to the second frequency.

2. The method according to claim 1, wherein the circuits and I/O are digital circuits and I/O.

3. The method according to claim 1, wherein the circuits and I/O further comprise analog circuits and analog I/O.

4. The method according to claim 1, wherein the reference oscillator is a watchdog timer or watchdog counter.

5. The method according to claim 4, further comprising:
    periodically waking up the circuits and the I/O from the sleep mode to the operational mode by the watchdog timer for a certain time so that the circuits can sample a further output of said frequency differentiator, wherein when a predetermined frequency change to at least a prior output value sample has occurred, then the circuits and the I/O will remain in the operational mode.

6. An electronic device having a low power sleep mode, comprising:
    circuits capable of being placed into a sleep mode;
    input-output (I/O) capable of being placed into the sleep mode, the I/O coupled to the circuits;
    sleep/wake-up logic for controlling when the circuits and the I/O are in the sleep mode or in an operational mode;
    a frequency differentiator having first and second inputs and an output coupled to the sleep/wake-up logic;
    an external frequency source connection adapted for coupling to an external frequency source and coupled to the first input of the frequency differentiator; and
    a reference oscillator coupled to the second input of said frequency differentiator, wherein the reference oscillator is running when the device is in a low power sleep mode;
    wherein
        the frequency differentiator output is at a first output value when the external frequency source is at a first frequency, and
        the frequency differentiator output is at a second output value when the external frequency source is at a second frequency; whereby
        the sleep/wake-up logic does not wake up the circuits and the I/O from the sleep mode when the frequency differentiator output is at the first output value, and
        the sleep/wake-up logic wakes up the circuits and the I/O from the sleep mode to the operational mode when the frequency differentiator output is at the second output value.

7. The electronic device according to claim 6, wherein the circuits and I/O comprise digital circuits and digital I/O.

8. The electronic device according to claim 7, wherein the circuits and I/O further comprise analog circuits and analog I/O.

9. The electronic device according to claim 6, wherein the frequency differentiator, the sleep/wake-up logic and the watchdog timer are low power circuits of the electronic device that remain operational at all times.

10. The electronic device according to claim 6, wherein the first frequency is greater than the second frequency.

11. The electronic device according to claim 6, wherein the first frequency is less than the second frequency.

12. The electronic device according to claim 6, wherein the first output value is a logic zero and the second output value is a logic one.

13. The electronic device according to claim 6, wherein the first output value is a logic one and the second output value is a logic zero.

14. The electronic device according to claim 6, wherein the external frequency source is a frequency shift keying (FSK) signal.

15. The electronic device according to claim 6, wherein the external frequency source is a pulse width modulation (PWM) signal.

16. The electronic device according to claim 6, wherein the reference oscillator and the frequency differentiator are low power circuits of the electronic device that remain operational at all times.

17. The electronic device according to claim 7, wherein some of the digital circuits comprise a digital processor and memory.

18. The electronic device according to claim 17, wherein the digital processor is selected from the group consisting of a microprocessor, a microcontroller, a digital signal processor, and a programmable logic array.

19. The electronic device according to claim 17, wherein the memory is volatile memory and is selected from the group consisting of static random access memory (RAM) and dynamic RAM.

20. The electronic device according to claim 17, wherein the memory is non-volatile memory and is selected from the group consisting of read only memory (ROM), FLASH memory, and electrically erasable and programmable read only memory (EEPROM).

21. The electronic device according to claim 6, wherein the circuits, the I/O, the sleep/wake-up logic, the reference oscillator, and the frequency differentiator are fabricated on at least one integrated circuit die.

22. The electronic device according to claim 21, wherein the at least one integrated circuit die is packaged in an integrated circuit package with the external frequency source connection on the integrated circuit package.

23. The electronic device according to claim 6, wherein the frequency differentiator comprises:
    the reference oscillator; and
    a digital comparator having a first input coupled to the reference oscillator and a second input coupled to the external frequency source connection, an output of the digital comparator is the frequency differentiator output and produces the first and second output values.

24. The electronic device according to claim 6, wherein the frequency differentiator comprises:
    the reference oscillator;
    a multiplexer having a first input coupled to the reference oscillator and a second input coupled to the external frequency source connection; and
    a digital scaler having an input coupled to the multiplexer, an output of the digital scaler is the frequency differentiator output and produces the first and second output values.

25. The electronic device according to claim 6, wherein the reference oscillator is a watchdog timer or watchdog counter.

26. The electronic device according to claim 25, wherein the watchdog timer or watchdog counter is part of a microcontroller.

27. The electronic device according to claim 25, wherein the watchdog timer is further coupled to the sleep/wake-up logic, and wherein the timer can be configured to periodically causes the sleep/wake-up logic to wake up the circuits and the I/O from the sleep mode to the operational mode for a certain time so that the circuits can sample a second output from the frequency differentiator, wherein when a predetermined frequency change to at least a prior output value sample has occurred, then the circuits and the I/O will remain in the operational mode.

28. The electronic device according to claim 27, wherein the circuits have a finer frequency differentiation resolution than the output of said frequency differentiator.

29. The electronic device according to claim 6, wherein the frequency differentiator comprises:
- a counter coupled to the external frequency source connection;
- wherein the reference oscillator is a period timer coupled to the counter;
- a register coupled to the counter and the period timer, an output of the register is the frequency differentiator output and produces the first and second output values.

30. An microcontroller having a low power sleep mode, comprising:
- a watchdog timer having an output, wherein the watchdog timer is operable to run when the device is in a low power sleep mode;
- circuits capable of being placed into a sleep mode;
- input-output (I/O) capable of being placed into the sleep mode, the I/O coupled to the circuits;
- sleep/wake-up logic for controlling when the circuits and the I/O are in the sleep mode or in an operational mode;
- a frequency differentiator having first and second inputs, wherein the first input is coupled with the output of the watchdog timer, and an output coupled to the sleep/wake-up logic; and
- an external frequency source connection adapted for coupling to an external frequency source and coupled to the second input of the frequency differentiator;

wherein
- the frequency differentiator output is at a first output value when the external frequency source is at a first frequency, and
- the frequency differentiator output is at a second output value when the external frequency source is at a second frequency; whereby
- the sleep/wake-up logic does not wake up the circuits and the I/O from the sleep mode when the frequency differentiator output is at the first output value, and
- the sleep/wake-up logic wakes up the circuits and the I/O from the sleep mode to the operational mode when the frequency differentiator output is at the second output value.

31. The electronic device according to claim 30, wherein the watchdog timer is further coupled to the sleep/wake-up logic, and wherein the timer can be configured to periodically causes the sleep/wake-up logic to wake up the circuits and the I/O from the sleep mode to the operational mode for a certain time so that the circuits can sample a second output from the frequency differentiator, wherein when a predetermined frequency change to at least a prior output value sample has occurred, then the circuits and the I/O will remain in the operational mode.

32. The electronic device according to claim 31, wherein the circuits have a liner frequency differentiation resolution than the output of said frequency differentiator.

* * * * *